Nov. 16, 1965  K. SCHMITT ETAL  3,218,354
PROCESS FOR SEPARATION OF ISOMER MIXTURES
OF TRIALKYL ADIPIC ACID
Filed Dec. 11, 1961
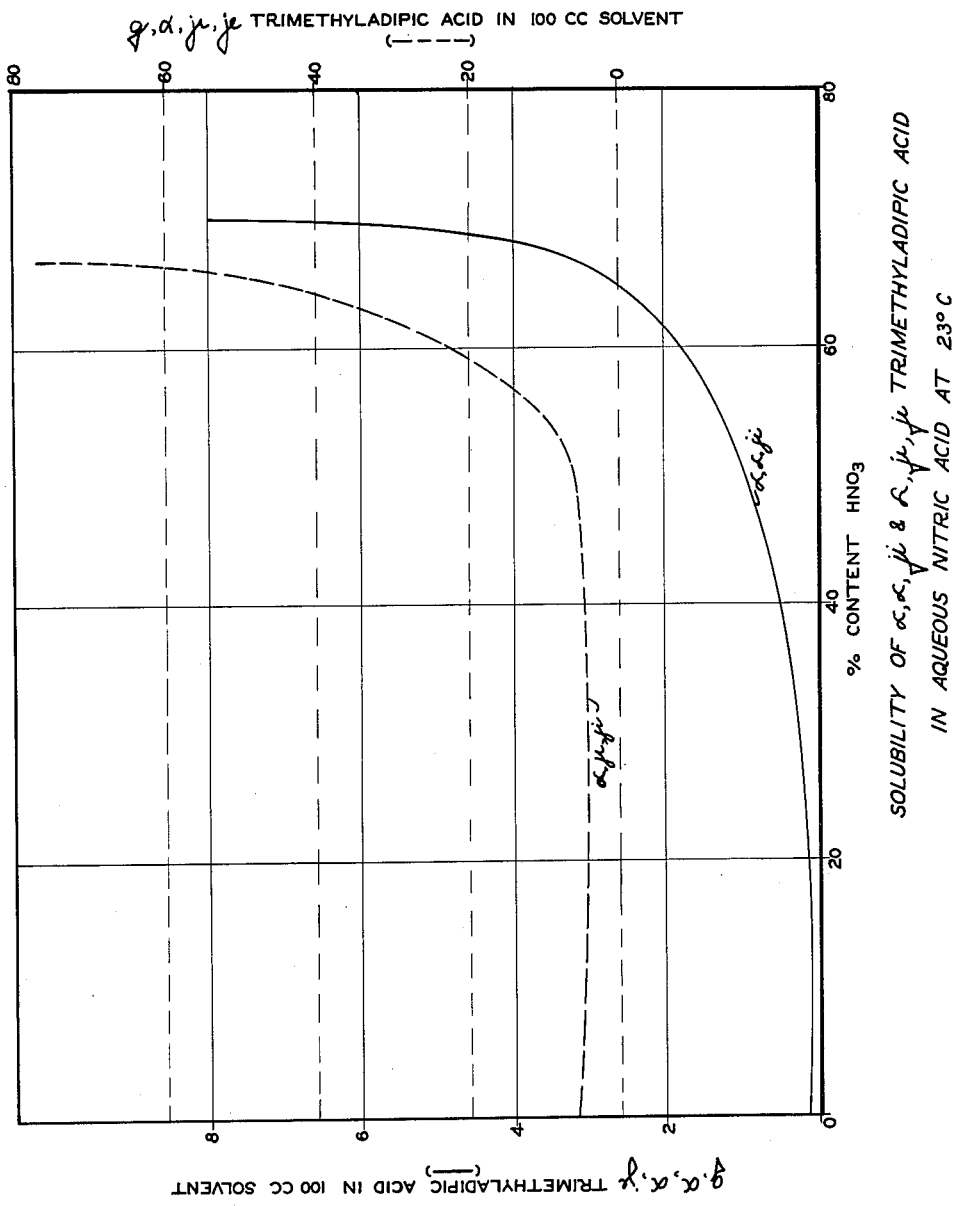
INVENTORS
KARL SCHMITT
HANS HEUMANN
WILHELM POLLACK
BY
ATTORNEYS

United States Patent Office 3,218,354
Patented Nov. 16, 1965

3,218,354
PROCESS FOR SEPARATION OF ISOMER MIXTURES OF TRIALKYL ADIPIC ACID
Karl Schmitt and Hans Heumann, Herne, West, and Wilhelm Pollack, Wanne-Eickel, Germany, assignors to Hibernia-Chemie G.m.b.H., Gelsenkirchen-Buer, Germany, a German corporation
Filed Dec. 11, 1961, Ser. No. 159,480
Claims priority, application Germany, Dec. 12, 1960, B 60,454
10 Claims. (Cl. 260—537)

The present invention relates to a process for the separation of isomer mixtures, and more particularly for obtaining alpha, alpha, gamma-trialkyl adipic acid from an isomer mixture of said acid with alpha, gamma, gamma-trialkyl adipic acid.

It is known to separate isomer mixtures of alpha, alpha, gamma-and alpha, gamma, gamma-trimethyl adipic acids into the individual components by means of fractional crystallization and recrystallization using aqueous formic acid. However, a separation of the two components of the mixture can only be carried out with great difficulty, and the process is considered cumbersome due to the fact that a multi-stage procedure is involved.

It is an object of the present invention to overcome the foregoing disadvantages and to provide a process for separating from an isomer mixture of alpha, alpha, gamma-and alpha, gamma, gamma-trialkyl adipic acids, the respective isomer components.

It is another object of the present invention to provide such a process by the selective recovery of the isomers from a nitric acid solution of a mixture of the isomers.

Other and further objects of the invention will become apparent from a study of the within specification and accompanying drawing, in which the figure illustrates a graph of the solubilities of alpha, alpha, gamma-and alpha, gamma, gamma-trimethyl adipic acids in aqueous nitric acid with increasing acid concentration.

It has been found in accordance with the present invention that a versatile and efficient process may be provided for obtaining alpha, alpha, gamma-trialkyl adipic acid from an isomer mixture of alpha, alpha, gamma-trialkyl adipic acid and alpha, gamma, gamma-trialkyl adipic acid, by the step which comprises crystallizing alpha, alpha, gamma-trialkyl adipic acid from an at least about 50% nitric acid solution of a mixture of the isomers, whereby the crystallized isomer may be recovered from the remaining solution. Specifically, the invention preferably contemplates a separation of alpha, alpha, gamma-trimethyl adipic acid from an isomer mixture of such acid with alpha, gamma, gamma-trimethyl adipic acid.

The nitric acid concentration is preferably about 65–67%, although the concentration may range between about 50–75%, concentrations above 75% leading to no further useful purpose since sufficient separation effects are not achieved at nitric acid concentrations exceeding about 75%. Therefore, while the invention may be suitably practiced using nitric acid solutions having a concentration between about 60–70%, a concentration of about 65–67% is most preferred.

Initially, a clear solution may be prepared from an isomer mixture of the acids by dissolving the mixture in the nitric acid at a temperature between about 50–100 degrees C. Once the isomer mixture is present in the nitric acid solution, selective crystallization of the alpha, alpha, gamma-isomer may be carried out. This is done by cooling the nitric acid solution to a temperature between about —5 and plus 30 degrees C. Once the alpha, alpha, gamma-isomer has been recovered, as for example by filtration, the alpha, gamma, gamma-isomer may be crystallized from the solution which remains by cooling the solution at least about 5–10 degrees below the temperature used for the crystallization of the alpha, alpha, gamma-isomer. The second crystallization is conveniently carried out, therefore, at a temperature between about —20 and plus 5 degrees C., depending upon the temperature used for crystallizing the first isomer component.

Thus, the selective separation is effected by crystallizing the first isomer component from the nitric acid solution and thereafter cooling the solution slightly to effect crystallization of the second isomer component. For this purpose, the solution remaining after removal of the first isomer component may be concentrated prior to further cooling, in order to render the crystalline separation of the second component, i.e. the alpha, gamma, gamma-isomer, more effective and efficient.

Alternatively, the present invention contemplates the recovery of the second component from the solution remaining after removing the crystals of the first component, by treating the solution with an organic solvent so as to extract the alpha, gamma, gamma-isomer into the organic solvent. Such isomer may then be obtained by distilling off the organic solvent.

In essence, the present invention advantageously provides a process for obtaining alpha, alpha, gamma-trimethyl adipic acid from an isomer mixture of alpha, alpha, gamma-and alpha, gamma, gamma-trimethyl adipic acids by first crystallizing the alpha, alpha, gamma-isomer from a 50–75% nitric acid solution of a mixture of the isomers at a temperature between about —5 and plus 30 degrees C., and recovering the crystallized alpha, alpha, gamma-isomer, whereupon the alpha, gamma, gamma-isomer may be crystallized thereafter from the remaining solution by cooling the solution at least about 5–10 degrees and within the range of —20 and plus 5 degrees C. The overall procedure for separation into the respective components of an isomer mixture of alpha, alpha, gamma-and alpha, gamma, gamma-trimethyl adipic acids contemplates dissolving the isomer mixture in a solution of 50–75% nitric acid, at a temperature between about 50–100 degrees C., cooling the resulting isomer solution to between —5 and plus 30 degrees C. to crystallize the alpha, alpha, gamma-isomer, collecting said isomer, further cooling the solution at least about 5–10 degrees C. more to crystallize the alpha, gamma, gamma-isomer and thence collecting the alpha, gamma, gamma-isomer.

The isomers may be dissolved in the nitric acid in the ratio of about 1:1 by weight, although other ratios in the range of about 70:30 parts by weight of the two isomers may be separated in accordance with the invention with equally good results. Moreover, the isomers may be dissolved in the nitric acid so that the same are present in a total amount of about 4–1 parts by weight per part by volume of nitric acid, the latter having a concentration of 50–75%. These ratios are to be preferred, although ratios outside of the range mentioned are also effective.

As may be noted from the accompanying drawing, the two isomers, i.e. alpha, alpha, gamma-and alpha, gamma, gamma-trimethyl adipic acids exhibit surprisingly divergent solubilities in aqueous nitric acid in dependence upon the nitric acid concentration used. The alpha, alpha, gamma-isomer has a melting point of 105–106 degrees C. while the alpha, gamma, gamma-trimethyl adipic acid has a melting point of 72–73 degrees C. The isomer mixtures are readily obtained from the oxidation of trialkyl cyclohexanol and/or trialkyl cyclohexanone, and specifically 1,1,3-trimethyl cyclohexanol-5 and/or 1,1,3-trimethyl cyclohexanone-5. The oxidation procedure is carried out in the presence of nitric acid as oxidant.

The accompanying drawing illustrates that the solubility of the two isomers differs only very slightly at comparatively low nitric acid concentration whereas very clearly and sharply the difference in solubility becomes apparent once the nitric acid concentration exceeds about 50%. Advantage is taken of this fact for selectively crystallizing the isomers separately from the solution within the temperature ranges mentioned. Reference to the drawing will indicate that at 40% nitric acid concentration, for example, about 3 grams of the alpha, gamma, gamma-isomer and about 0.5 gram of the alpha, alpha, gamma-isomer are soluble. The difference in solubility of the isomers at this acid range, therefore, is of insignificant magnitude. However, when using a nitric acid concentration of 67%, the solubility of the alpha, alpha, gamma-isomer increases from about 0.5 gram (at 40% nitric acid concentration) to about 3 grams. On the other hand, the alpha, gamma, gamma-isomer solubility markedly increases from about 3 grams (at 40% nitric acid concentration) to about 76 grams. The significant jump-like increase in the solubility difference between the two isomers is evident from a comparison of the solubility curves with changing nitric acid concentration.

Actually, where the oxidation reaction mixture from the aqueous nitric acid oxidation of 1,1,3-trimethyl cyclohexanol-5 and/or 1,1,3-trimethyl cyclohexanone-5, is to be separated into the isomer components, a single recrystallization of the crystalline raw product oxidation reaction mixture is all that is necessary. The recrystallization, of course, contemplates dissolving the raw crystals into nitric acid of at least 50% concentration, and cooling the resultant solution whereby, for example, where the isomers are present in a ratio of 1:1, over 90% of the alpha, alpha, gamma-trimethyl adipic acid present in the raw product will be recovered in very pure form with a melting point of 102–103 degrees C. Naturally, if still greater purity is desired, one or more further crystallization steps may be employed using nitric acid as the crystallizing vehicle. The crystallizing of the alpha, alpha, gamma-trimethyl adipic acid may be aided by stirring the nitric acid solution during the cooling. Upon filtering off the crystalline product, the same is washed and, if desired, thereafter dried. The isolation of the alpha, gamma, gamma-trimethyl adipic acid is carried out by simply cooling the mother liquor remaining from the recrystallization of the isomer mixture from the nitric acid solution, the cooling of such mother liquor preferably being carried out after prior concentration in the well known manner. Besides crystallizing the alpha, gamma, gamma-trimethyl adipic acid from the solution in the same way as the first isomer is crystallized, albeit at a crystallizing temperature 5–10 degrees therefrom, recovery of the alpha, gamma, gamma-isomer may be effected using extraction techniques. In this instance, the mother liquor is extracted with an organic solvent to separate the isomer into the organic solvent phase. Among such organic solvents or hydrocarbon solvents are hydrocarbons, halogenated hydrocarbons, etc. including, for example, cyclohexane, carbon tetrachloride, hydrocumene, etc. Suitably, the boiling point of the organic solvent at normal pressure should be above about 45 degrees C. so that subsequent removal of the solvent may take place by distillation in a simple manner.

The invention is further illustrated by the following examples, and it is to be understood that the invention is not to be limited thereby.

*Example 1*

In accordance with the procedure disclosed in co-pending U.S. application Serial No. 42,220, filed July 12, 1960, in order to form an isomer mixture of alpha, alpha, gamma-and alpha, gamma, gamma-trimethyl adipic acids, 1 kg. of 1,1,3-trimethyl cyclohexanol-5 was added drop by drop over a period of 50 minutes to 3,000 grams of 67% nitric acid. During this time, the nitric acid was continuously stirred. The reaction temperature was maintained at 80 degrees C. by suitably cooling the reaction vessel. Thereafter, the reaction mixture was stirred for an additional one half hour at the same temperature and then cooled to −10 degrees C. Upon reaching this lower temperature, the reaction mixture was seeded with crystalline trimethyl adipic acid and stirred for one hour longer. The isomer acids precipitate in this manner and the separated isomer crystals are filtered, washed with water, and dried. The product obtained consists of a mixture of alpha, alpha, gamma-and alpha, gamma, gamma-trimethyl adipic acids in a weight ratio of approximately 1:1. This mixture is then washed with water and dried over $P_2O_5$. The mixture still contains about 2% nitric acid and 3% water.

100 grams of the crude isomer mixture obtained in the foregoing manner, together with 50 cc. of 67% $HNO_3$ are heated to 50 degrees C. on a water bath over a period of 15 minutes, whereby a clear, faintly yellow colored solution is formed. This solution is allowed to stand at room temperature (23 degrees C.) for about 20 hours. After initial strong turbidity, a thick crystalline mass gradually separates out, the mass of crystals being drawn off by means of a suction filter. The residue is washed with 50 cc. of water, subsequently covered with 20 cc. of water, and dried finally in vacuum over $P_2O_5$. In this manner, 44.2 grams of alpha, alpha, gamma-trimethyl adipic acid having a melting point of 102—103 degrees C. are isolated. The product contained less than 0.1% nitric acid and is not discolored. In the cooling of the mother liquor to about −5 degrees C., 29.4 grams of alpha, gamma, gamma-trimethyl adipic acid having a melting range of 67–71 degrees C. crystallize out. The residual mother liquor may be returned to the oxidation process, according to the procedure disclosed in copending U.S. application Serial No. 42,220, after pretreatment with high concentration nitric acid.

*Example 2*

100 grams of crude, unwashed, moist isomer mixture, obtained in accordance with the procedure of said copending U.S. application Serial No. 42,220, which still contained about 13% nitric acid and 20% water, were heated in the same manner as in Example 1, with 50 cc. of 67% $HNO_3$. The clear, faintly colored solution obtained is stirred at room temperature for 7½ hours. The crystals which separate during this time are then drawn off by filtration and the crystals are worked up in the manner outlined in Example 1. The 45.5 grams of alpha, alpha, gamma-trimethyl adipic acid obtained in this way had a melting range which started at 99–101 degrees C. In this isolated product about 0.3% of nitric acid still remained from the 13% originally present in the crude mixture. The alpha-gamma, gamma-isomer is obtained in this instance by extracting the mother liquor remaining upon filtration 3 times with 30 cm.³ carbon tetrachloride at room temperature (23 degrees C.), and washing of the so obtained solution with water. The alpha, gamma, gamma-isomer is recovered from the organic solvent by subsequent distillation under vacuum at a temperature above about 45 degrees C.; yield 30.1 grams alpha, gamma, gamma-trimethyl adipic acid.

In view of the foregoing examples, taken in connection with the accompanying, it will be seen that both of the isomers become more soluble as the concentration of nitric acid increases, the scale of solubility being of a different order of magnitude in each instance. The isolations of the two isomers may be carried out within overlapping temperature ranges only in the sense that the first crystallization is carried out at a temperature at least about 5–10 degrees above that used for the second crystallization.

It will be appreciated that the cyclo compounds which are oxidized with the nitric acid include trialkyl cyclohexanol and trialkyl cyclohexanone compounds and preferably tri-lower-alkyl cyclohexanol and tri-lower-alkyl cyclohexanone compounds. The three alkyl side chains attached to the ring may assume any position thereon and preferably two of the three alkyl substituents are located on the same ring carbon atom. Preferably, the three alkyl substituents of identical chain length, asymmetrically positioned on the ring. In this manner, the products obtained are alpha, alpha, gamma- and alpha, gamma, gamma-trialkyl adipic acid isomers. Of course, where the alkyl substituents of the starting compounds are methyl, ethyl, propyl, etc., the trialkyl adipic acid isomers obtained will be the corresponding trimethyl, triethyl, tripropyl, etc., adipic acid alpha, alpha, gamma-and alpha, gamma, gamma-isomers. The isomer mixtures to be separated in accordance with the present invention contemplate mixtures of isomers of the foregoing kind.

What is claimed is:

1. Process for obtaining alpha, alpha, gamma-trialkyl adipic acid from an isomer mixture of alpha, alpha, gamma-trialkyl adipic acid and alpha, gamma, gamma-trialkyl adipic acid which comprises crystallizing alpha, alpha, gamma-trialkyl adipic acid from an at least about 50% aqueous nitric acid solution of a mixture of the isomers by cooling the mixture to a temperature between about −5 and 30 degrees C. and recovering the crystallized isomer therefrom.

2. Process according to claim 1 wherein said acids are alpha, alpha, gamma-and alpha, gamma, gamma-trimethyl adipic acids.

3. Process according to claim 2 wherein the crystallizing is carried out at room temperature and the nitric acid concentration is about 65–67%.

4. Process according to claim 2 wherein the alpha, gamma, gamma-trimethyl adipic acid is thereafter recovered from the remaining solution by treating said solution with a hydrocarbon solvent to extract the alpha, gamma, gamma-isomer into the organic solvent.

5. Process according to claim 4 wherein said isomer is obtained by distilling said hydrocarbon solvent.

6. Process for obtaining alpha, alpha, gamma-trimethyl adipic acid from an isomer mixture of alpha, alpha, gamma-and alpha, gamma, gamma-trimethyl adipic acids which comprises crystallizing the alpha, alpha, gamma-isomer from a 50–75% aqueous nitric acid solution of a mixture of the isomers in an isomer ratio of 70:30–30:70 parts of weight by cooling the mixture to a temperature between about −5 and 30 degrees C., and recovering the crystallized alpha, alpha, gamma-isomer.

7. Process according to claim 6 wherein the alpha, gamma, gamma-isomer is thereafter crystallized from the remaining solution by further cooling said solution at least about 5 to 10 degrees C. more and within the range of −20 and 5 degrees C.

8. Process according to claim 7 wherein the remaining solution is concentrated prior to the further cooling.

9. Process for the separation of an isomer mixture of alpha, alpha, gamma-and alpha, gamma, gamma-trimethyl adipic acids which comprises dissolving the isomer mixture in an isomer ratio of 70:30–30:70 parts by weight in a solution of 50–75% aqueous nitric acid, at a temperature between about 50 and 100 degrees C., cooling the resulting isomer solution to between −5 and 30 degrees C. to crystallize the alpha, alpha, gamma-isomer, collecting said isomer, further cooling said solution at least about 5 to 10 degrees C. more and between about −20 and 5 degrees C. to crystallize the alpha, gamma, gamma-isomer and collecting the alpha, gamma, gamma-isomer.

10. Process according to claim 9 wherein the nitric acid concentration is about 65–67%, the isomers are dissolved in the ratio of about 1:1 by weight and the isomers are present in a total amount of about 4–1 parts by weight per part by volume of nitric acid.

References Cited by the Examiner

UNITED STATES PATENTS 2,300,955　11/1942　Meier _____ 260—537
2,824,135　2/1958　Corcoran _____ 260—537

LORRAINE A. WEINBERGER, *Primary Examiner.*

LEON ZITVER, *Examiner.*